(12) United States Patent
Komine et al.

(10) Patent No.: US 6,729,627 B2
(45) Date of Patent: May 4, 2004

(54) CAPPED COLLET AND COLLET CAP

(75) Inventors: Tsuyoshi Komine, Hyogo (JP); Haruaki Kubo, Hyogo (JP)

(73) Assignee: Big Alpha Co., Inc., Hyogo (JP)

( * ) Notice: Subject to any disclaimer, the term of this patent is extended or adjusted under 35 U.S.C. 154(b) by 22 days.

(21) Appl. No.: 10/059,890

(22) Filed: Jan. 29, 2002

(65) Prior Publication Data

US 2002/0145260 A1 Oct. 10, 2002

(30) Foreign Application Priority Data

Apr. 10, 2001 (JP) ........................................ 2001-309176

(51) Int. Cl.[7] .............................................. B23B 31/20
(52) U.S. Cl. ...................... 279/157; 279/20; 279/43.9; 279/46.9; 408/56
(58) Field of Search ........................ 279/20, 43.9, 46.9, 279/157; 408/56, 57, 59–61; 409/136; 407/11

(56) References Cited

U.S. PATENT DOCUMENTS

| | | | | |
|---|---|---|---|---|
| 4,320,999 A | * | 3/1982 | Briese | 408/59 |
| 5,340,127 A | * | 8/1994 | Martin | 279/20 |
| 5,567,093 A | * | 10/1996 | Richmond | 279/46.9 |
| 5,975,817 A | * | 11/1999 | Komine | 279/20 |
| 5,984,595 A | * | 11/1999 | Mizoguchi | 408/57 |

FOREIGN PATENT DOCUMENTS

EP 0 924 012 A1 6/1999

* cited by examiner

Primary Examiner—Daniel W. Howell
(74) Attorney, Agent, or Firm—Wolf, Greenfield & Sacks

(57) ABSTRACT

The present invention provides a capped collet and a cap attached to the collet, which are capable of efficiently supplying a cooling fluid to a tool according to the type of the tool held therein, and of performing satisfactory cooling. The capped collet comprises: a collet body 10; a cap 11 which is attached to the top-end side of the collet body 10 in an attachable and detachable manner and which allows the tool to pierce therethrough; and a sealing member 12 placed between a tool holder 101 and the cap 11 in order to hermetically seal a space between them. The collet body 10 has a slot 13 formed at least from the top-end side thereof, and an annular projection 21 which is formed on the top-end side and which is coupled with the cap 11. The cap 1 has an annular groove 18 for coupling with the annular projection 21 of the collet body 10, and a cover 22 for covering the end face of the collet body 10 on the top-end side.

16 Claims, 21 Drawing Sheets

FIG.17
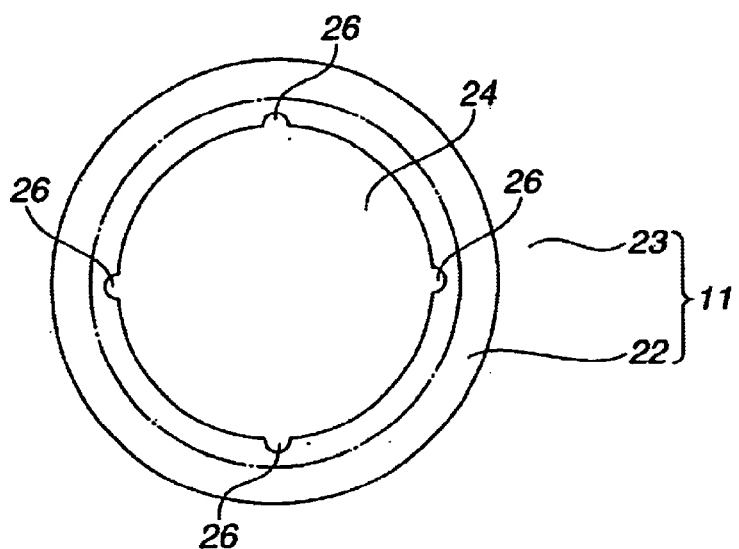
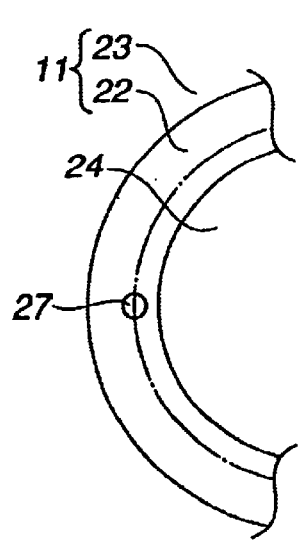 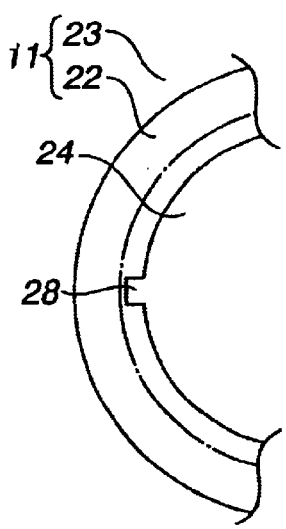 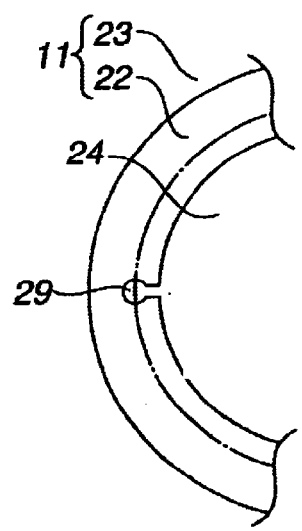
FIG. 18a  FIG. 18b  FIG. 18c

CAPPED COLLET AND COLLET CAP

BACKGROUND OF THE INVENTION

1. Field of the Invention

The present invention relates to a capped collet for holding a tool, which is inserted into a tool holder mounted to a main spindle of, for example, a machine tool, and also relates to a cap attached to the collet.

2. Description of the Related Art

In tool machines such as lathes, drilling machines, or milling machines, collets have been used as a part of holders for holding tools such as drills or end mills. This type of collet generally comprises a collet body, into which a shank of the tool is inserted, and slots formed in the collet body.

It is necessary to cool these tools continuously in order to suppress heat generated at the time of processing (cutting) works. The tools are sometimes lubricated in order to obtain better workability. As a method for such cooling and lubrication, a cutting fluid (cooling fluid) such as a water soluble coolant, oil, mist, or semi-dry fluid is supplied to the tool. As an example of the method for supplying the cutting fluid to a tool, a tool with a through hole extending in its lengthwise direction is used and the tool is cooled by causing the cutting fluid to flow through the through hole. This method is intended to supply the cutting fluid to the through hole in the tool efficiently, for example, by providing a weir material at a specified position of the slot in order to prevent the cutting fluid from flowing out from the slot formed in the collet body, or by providing a sealing mechanism on the base-end side (opposite to the tool-inserting side) of the collet body.

When a tool is used which has no through hole described above, there is a general method for cooling the tool by supplying the cutting fluid between the collet and the tool held by the collet by utilizing the slot formed in the collet body.

When the method of cooling the tool by causing the cutting fluid to flow through the through hole of the tool is employed, it may be burdensome to insert the weir material into the slot. There is also a fear that the weir material may easily come off the slot when the collet body is contracted to hold the tool. On the other hand, the collet with the sealing mechanism on the base-end side of the collet body has the drawback that it is impossible to adopt various methods for supplying the cutting fluid according to the type of the tool.

In the method of supplying the cutting fluid to the tool by utilizing the slot formed in the collet body, a cross-sectional area of the slot in its radial direction changes depending on the diameter of the tool to be inserted into the collet body and, therefore, the speed of the cutting fluid changes accordingly. As a result, there is a fear that it may become difficult to always supply the cutting fluid efficiently to a desired position of the tool. Particularly, there is a fear that even if the cutting fluid is supplied at high pressure, the cutting fluid may be dispersed due to centrifugal force at the time of high-speed rotation before it reaches the cutting edge of the tool.

SUMMARY OF THE INVENTION

The present invention is aimed at improving the conventional collets and the caps attached to such collets as described above. It is an object of this invention to provide a capped collet and a cap attached to the collet, which can supply the cooling fluid to the tool efficiently at an appropriate flow velocity, with an appropriate flow rate, and in an appropriate flow direction, depending on the type of the tool held by the collet, thereby enabling satisfactory cooling.

In order to achieve this object, this invention provides a capped collet for holding a tool by inserting a shank of the tool in a center hole of the collet mounted in a tool holder for supplying a fluid to the tool, the collet comprising: a collet body for inserting the shank of the tool therein; a cap mounted on the tool-inserting side of the collet body in an attachable and detachable manner, for allowing the tool to pierce therethrough; and a sealing member located between the tool holder and the cap, for hermetically sealing a space between them; wherein the collet body has a slot formed at least from the tool-inserting side thereof, and a second coupling element formed in the tool-inserting side thereof to couple with the cap; and wherein the cap has a first coupling element for coupling with the second coupling element of the collet, and a cover for covering the tool-inserting end face of the collet body.

With the collet having this structure, it is possible to attach and remove the cap and to hermetically seal a space between the tool holder and the cap. Accordingly, it is possible to enhance general versatility by replacing the cap with another cap in the shape which satisfies various conditions such as the oil supply pattern of the tool, and desired flow rate, flow velocity, and flow direction of the cooling fluid.

The second coupling element can comprise an annular groove formed around the outer surface of the collet body on its tool-inserting side.

The first coupling element can comprise an annular projection formed around the inner surface of the cap, for coupling with the annular groove formed in the collet body.

The capped collet of this invention can cause the fluid to flow out from a gap formed between the cover of the cap and the tool. Accordingly, it is possible to arbitrarily decide, for example, the flow rate, flow velocity, and flow direction of the fluid by adjusting the size, shape, and other factors of the gap.

Concerning the capped collet of this invention, the cover of the cap can have a fluid path formed therein for causing the fluid to flow out. In this case, it is possible to arbitrarily decide, for example, the flow rate, flow velocity, and flow direction of the fluid by adjusting the formed position, size, shape, and other factors of the fluid path.

Moreover, the capped collet of this invention further comprises a sealing member for hermetically sealing a space between the cover of the cap and the tool, and the fluid can be made to flow out from a through hole formed therein. Accordingly, it is possible to cause the fluid to flow out efficiently from the through hole formed in the tool.

The sealing member which hermetically seals the space between the cover of the cap and the tool can cause the space to be hermetically sealed more tightly by means of the pressure of the fluid. Accordingly, even when a high-pressure fluid is supplied, it is possible to realize high sealability, thereby enabling efficient supply of the fluid from the through hole of the tool.

The capped collet of this invention may have a straight collet or a tapered collet.

Moreover, this invention provides a cap attached in an attachable and detachable manner to the tool-inserting side of a collet which holds a tool by inserting a shank of the tool in its center hole and which is mounted in a tool holder for supplying a fluid to the tool, and the cap comprises: a first coupling element for coupling with a second coupling element of the collet; a cover for covering the end face of the collet on the tool-inserting side; and a sealing member located between the tool holder and the cap, for hermetically sealing a space between them.

The cap having the above-described structure can be removed from the collet. Accordingly, it is possible to enhance general versatility of the collet by using the cap in the shape which satisfies various conditions such as the oil supply pattern of the tool, and desired flow rate, flow velocity, and flow direction of the cooling fluid.

The first coupling element can comprise an annular projection formed around the inner surface of the cap, for coupling with an annular groove formed around the outer surface of the collet.

The cap of this invention can cause the fluid to flow out from a gap formed between the cover and the tool.

Moreover, the cap of this invention can be structured in such a manner that the cover has a fluid path formed therein for causing the fluid to flow out.

Furthermore, the cap of this invention further comprises a sealing member for hermetically sealing a space between the cover and the tool, and the cap can be structured so as to cause the fluid to flow out from a through hole formed in the tool.

The sealing member which hermetically seals a space between the cover and the tool can be structured so as to cause the space to be hermetically sealed more tightly by means of the pressure of the fluid.

BRIEF DESCRIPTION OF THE DRAWINGS

FIG. 17 is a front view of a part of a capped collet according to another embodiment of this invention.

FIGS. 18a, 18b, and 18c show front views of a part of capped collets according to other embodiments of this invention.

DETAILED DESCRIPTION OF THE PREFERRED EMBODIMENTS

The capped collets according to embodiments of this invention are hereinafter explained with reference to the attached drawings. In the following embodiments, one side of the collet into which the tool is inserted is referred to as the "top-end side," while the other side of the collet is referred to as the "base-end side."

(Embodiment 1)

Figure 1:
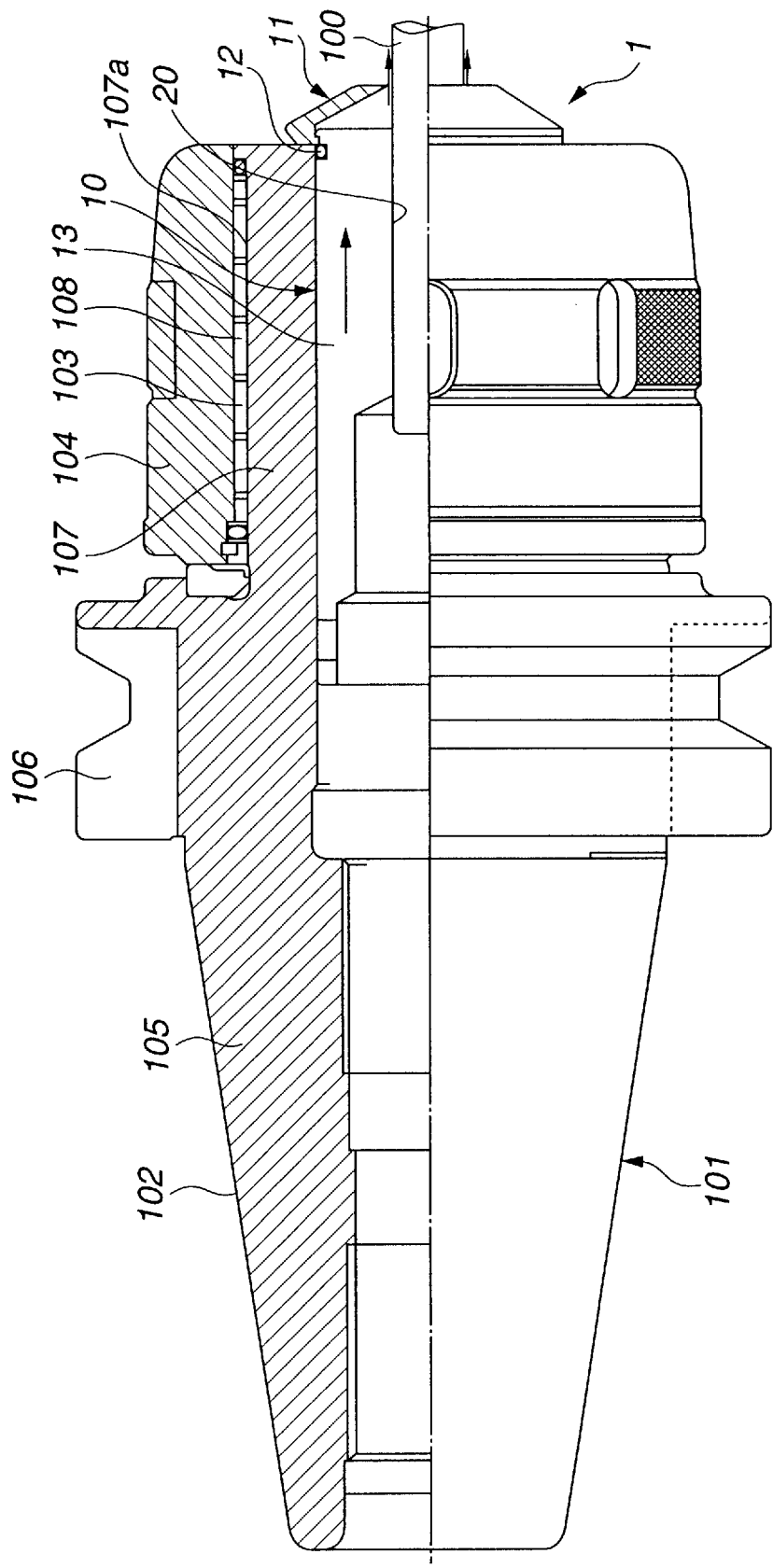
FIG. 1 is a partially sectional view illustrative of the state in which a capped collet according to Embodiment 1 of the present invention is mounted in a tool holder.
Figure 2:
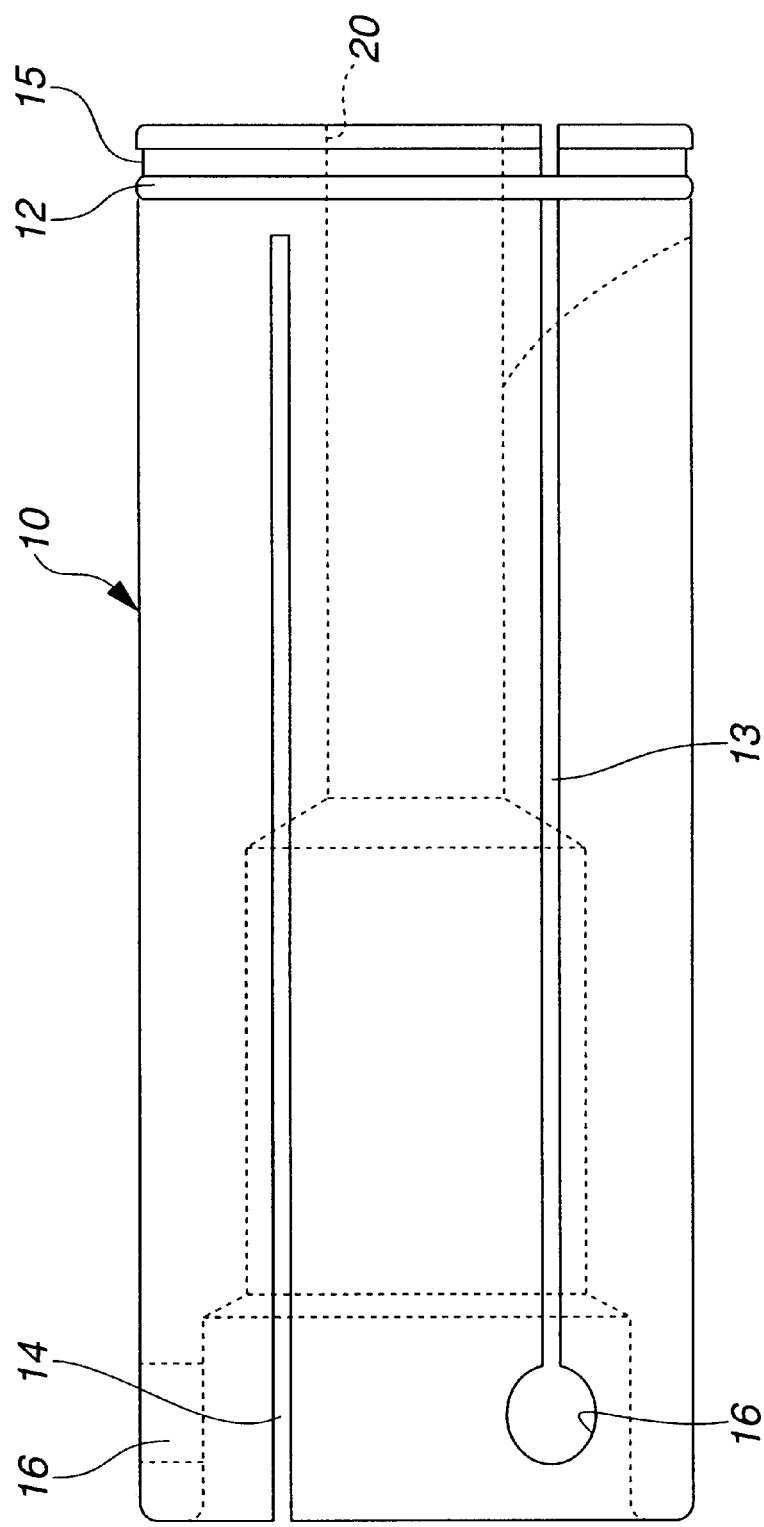
FIG. 2 is a side view of the collet shown in FIG. 1.
Figure 3:
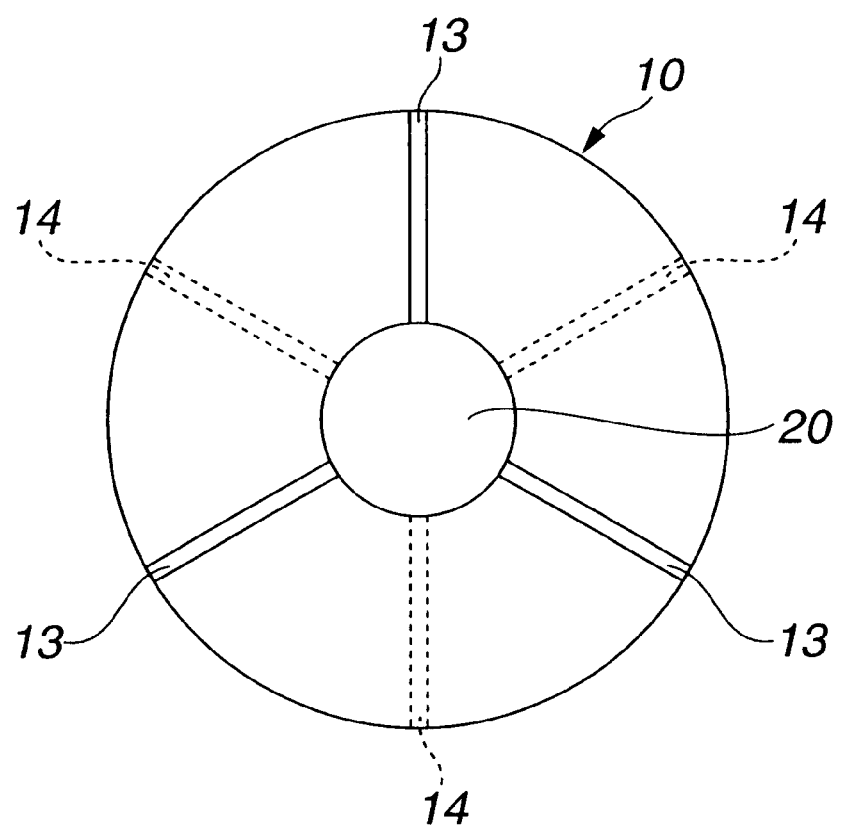
FIG. 3 is a plan view of the collet shown in FIG. 2.
Figure 4:
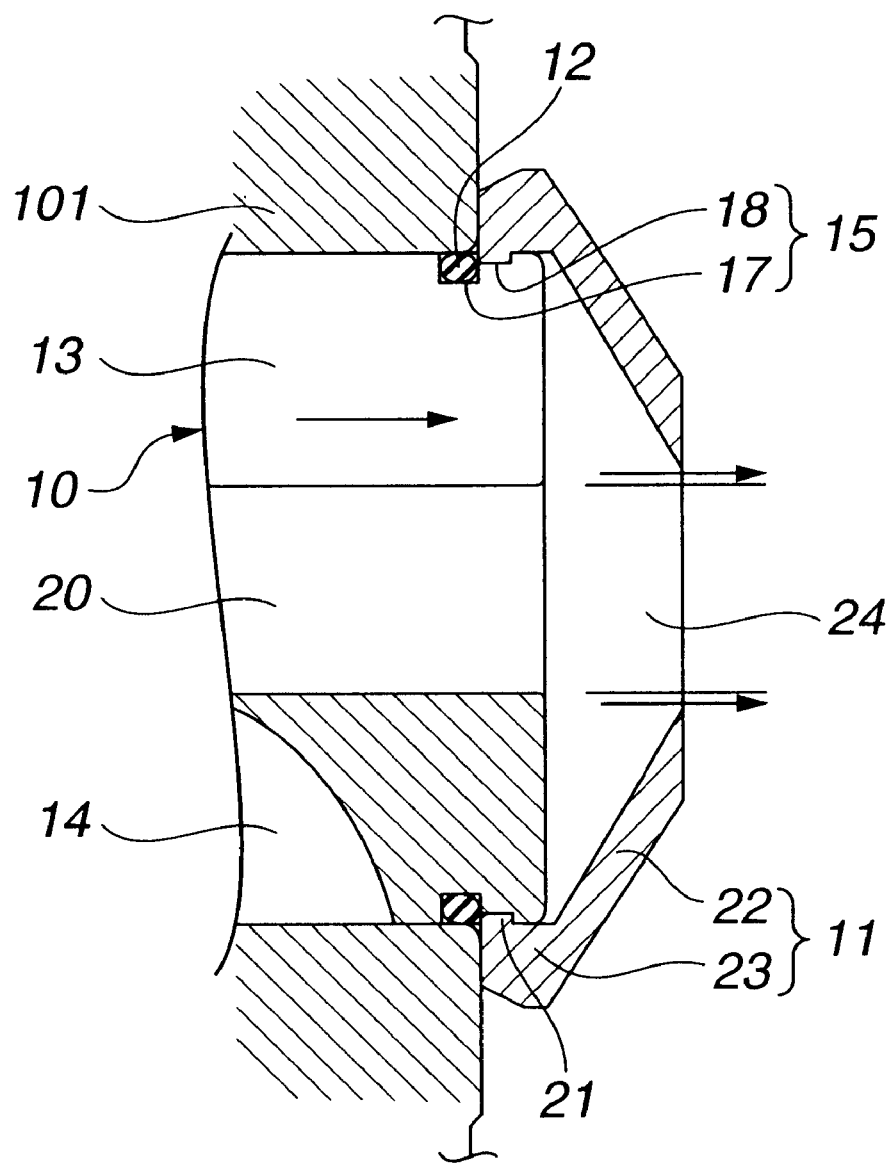
FIG. 4 is an enlarged sectional view of a part of FIG. 1.

FIG. 1 is a partially sectional view illustrative of the state in which a capped collet according to Embodiment 1 of the present invention is mounted into a tool holder. FIG. 2 is a side view of the collet shown in FIG. 1. FIG. 3 is a plan view of the collet shown in FIG. 2. FIG. 4 is an enlarged sectional view of a part of FIG. 1.

As shown in FIGS. 1 through 4, a capped collet 1 of Embodiment 1 is a straight collet and comprises: a collet body 10 for inserting a shank of a tool 100 into its center hole 20; a cap 11 mounted on the top-end side of the collet body 10 in a freely attachable and detachable manner, for causing the tool 100 to pierce therethrough; and a sealing member 12 located between a tool holder 101 and the cap 11, for hermetically sealing a space between them.

The collet body 10 is composed by comprising: slots 13 formed in the axial direction from the top-end side; slots 14 formed in the axial direction from the base-end side and between the adjacent slots 13; an annular groove 15 which is provided at the top-end part, is coupled with an annular projection 21 formed on the cap 11 as described later, and is provided with the sealing member 12; and holes 16 formed in the slots 13 on the base-end side.

A total of three slots 13 are formed, which are equally spaced at the same angle (120° in Embodiment 1). Likewise, a total of three slots 14 are formed, which are also equally spaced at the same angle. The collet body 10 with these slots 13 and 14 formed therein can expand or contract its own diameter by means of elastic deformation, thereby releasing or holding the shank of the tool 100. Moreover, contraction of the diameter of the collet body 10 by the elastic deformation makes it easier to attach the cap 11 to the top end of the collet body 10. By expanding the diameter of the collet body 10 after the attachment of the cap 11, it is possible to prevent the cap 11 from coming off the collet body 10.

Each hole 16 is connected continuously with the relevant slot 13 on the base-end side of all the slots 13 and is open in the radial direction of the collet body 10. This hole 16 is normally formed to relieve, for example, any stress imposed upon expansion or contraction of the diameter of the collet body 10.

Particularly as shown in FIG. 4, the annular groove 15 comprises a first annular groove 17, into which the sealing member 12 is inserted, and a second annular groove 18 which is connected continuously with the first annular groove 17 on the top-end side and is coupled with an annular projection 21 of the cap 11. The first annular groove 17 is formed with a depth slightly greater than that of the second annular groove 18. The depth of the first annular groove 17 can be decided arbitrarily according to the size, shape, and other factors of the sealing member 12.

The cap 11 is composed by comprising a cover 22 for covering the top-end face of the collet body 10, and a fitting part 23 which is formed continuously with the cover 22 and which is coupled with the second annular groove 18 of the collet body 10. In almost the center part of the cover 22, a hole 24 is formed for putting the tool 100 through the cap 11. This hole 24 is structured in such a manner that a gap is formed which can cause a cooling fluid to flow out toward a desired position (for example, the tip) of the tool 100 when the tool 100 is placed through the cap 11.

The sealing member 12 comprises an O-ring, which is inserted and placed in the first annular groove 17 to hermetically seal a space between the inner surface of the tool holder 101 and the cap 11.

The tool holder 101 in which this capped collet 1 is mounted is composed by comprising a tool holder body 102 and a clamping rotary sleeve 104 which is coupled through needle rollers 103 with the outer surface of the tool holder body 102 on the top-end side.

The tool holder body 102 comprises: a tapered shank 105 mounted on a main spindle (not shown in the relevant drawing) of, for example, a tool machine; a chuck positioning flange 106 which is formed at the end of the tapered shank 105 on its larger-diameter side; and a chuck cylinder 107 which protrudes from the flange 106 toward the top-end side of the tool holder body 102 and is arranged coaxially and integrally with the flange 106 and the tool holder body 102. The chuck cylinder 107 has slots (not shown in the relevant drawing) formed in its axial direction from the top-end side. These slots enable the chuck cylinder 107 to expand or contract its diameter by means of elastic deformation.

The needle rollers 103 are retained by retainers 108 and are positioned between the clamping rotary sleeve 104 and the chuck cylinder 107. By turning the clamping rotary sleeve 104, these needle rollers 103 revolve in a spiral manner relative to the outer surface 107a of the chuck cylinder 107 and, therefore, elastically contract the diameter of the chuck cylinder 107, thereby holding and securing the capped collet 1.

In order to insert and set the tool 100 in the capped collet 1 having the above-described structure, the shank of the tool 100 is inserted into the top-end side of the capped collet 1 held by the tool holder 101. Subsequently, the clamping rotary sleeve 104 is caused to revolve through the needle rollers 103 relative to the tool holder body 102, and the chuck cylinder 107 is then caused to elastically contract its diameter and to elastically contract the diameter of the collet body 10, thereby clamping the shank of the tool 100.

When the tool holder 101 is rotated in this state and the tool 100 is used to process a work, as the cooling fluid is supplied from the base-end side of the capped collet 1, the cooling fluid tends to flow through the slots 13 toward the top end as shown with arrows in FIGS. 1 and 4. Since the sealing member 12 is placed on the top-end side of the collet body 10, the cooling fluid does not leak out between the inner surface of the tool holder 101 and the cap 11, but is lead to the top end of the collet body 10. As stated above, the cap 11 attached to the top end of the collet body 10 is structured in such a manner that the cover 22 covers the top-end surface of the collet body 10 and a gap for letting the cooling fluid pass is formed only between the outer surface of the tool 100 and the cap 11. Accordingly, the cooling fluid is supplied efficiently from the gap formed between the cap 11 and the outer surface of the tool 100 toward a desired position such as the cutting edge of the tool 100. It is also possible to obtain the effect of making it easier to control the flow direction of the cooling fluid.

By setting the size of the gap arbitrarily, it is possible to appropriately control (or adjust) the flow velocity, flow rate, and other conditions of the cooling fluid supplied to the tool 100. As a result, even if the rotation (especially high-speed rotation) of the tool 100 creates a centrifugal force, it is possible to supply the cooling fluid efficiently to, for example, the cutting edge of the tool 100.

Figure 5:
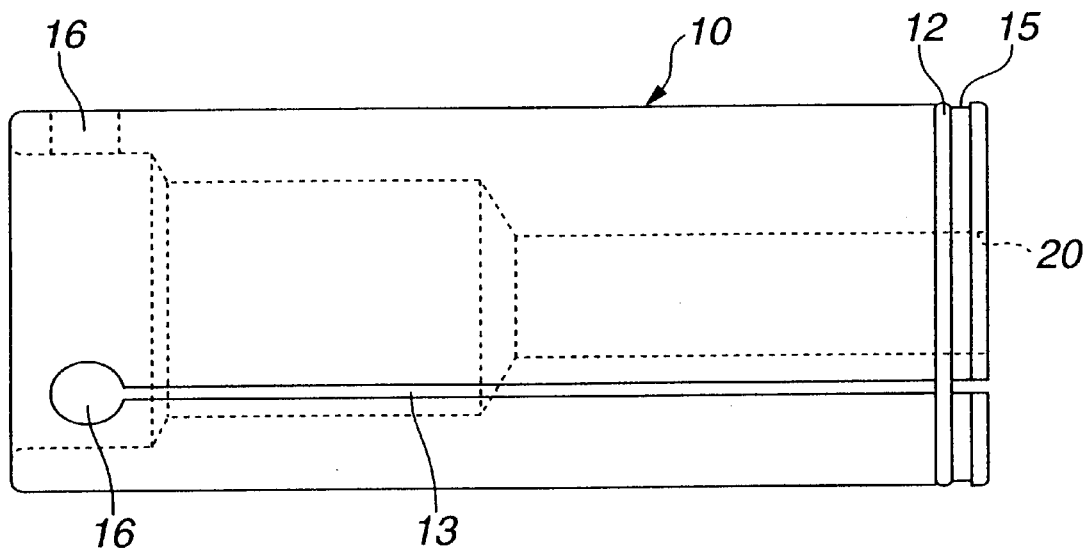
FIG. 5 is a side view of a collet according to another embodiment of this invention.
Figure 6:
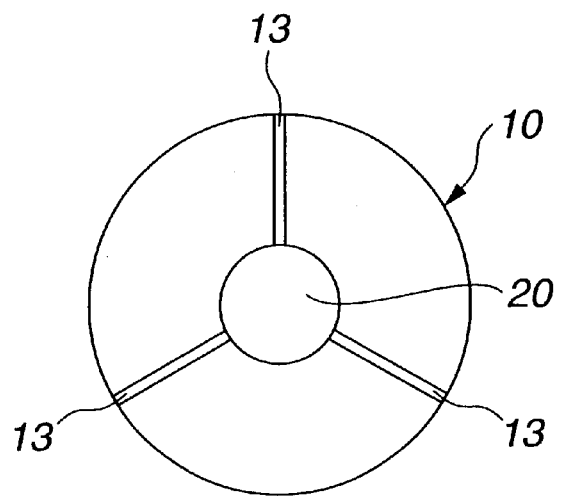
FIG. 6 is a plan view of the collet shown in FIG. 5.
Figure 7:
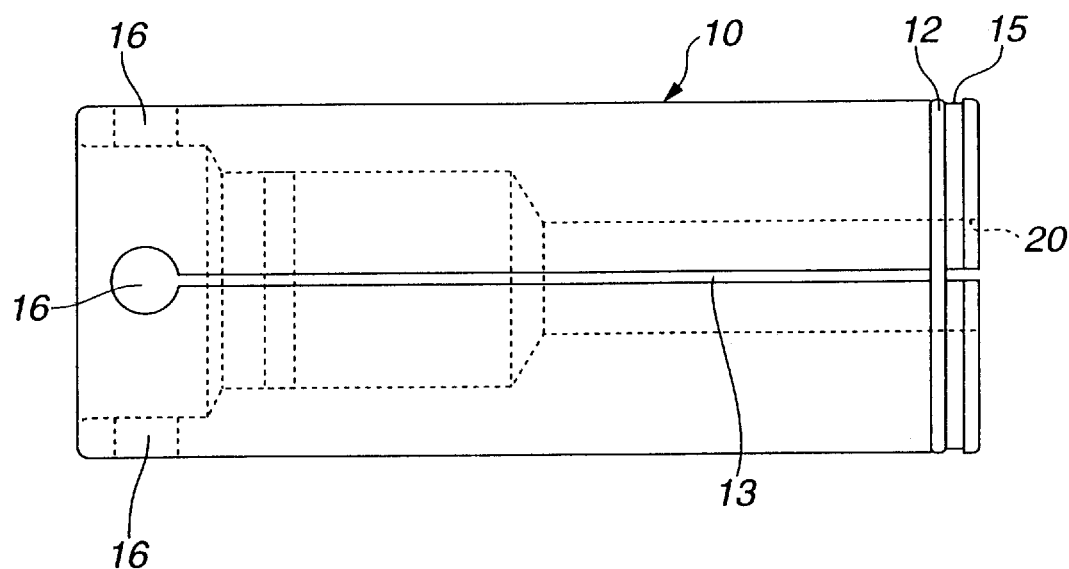
FIG. 7 is a side view of a collet according to still another embodiment of this invention.
Figure 8:
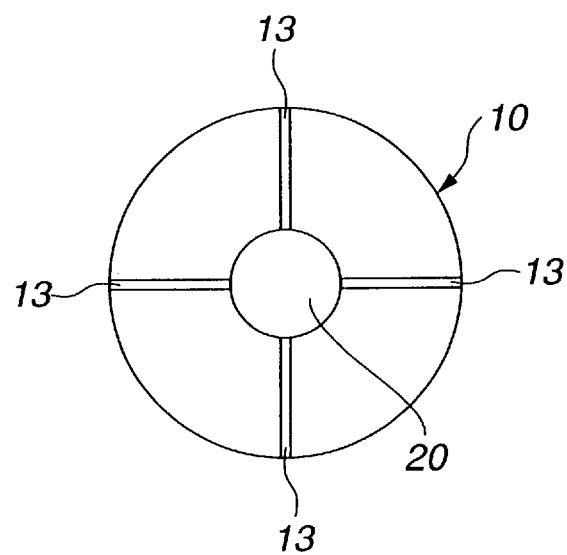
FIG. 8 is a plan view of the collet shown in FIG. 7.

Concerning Embodiment 1, explanations have been given about the capped collet 1 having the three slots 13 and the three slots 14 formed therein. However, without limitation to such structure, the capped collet 1 may at least have the slots 13 formed from the top-end side as shown in FIGS. 5 through 8. Moreover, the number of the slots 13 to be formed can be decided arbitrarily as desired to be, for example, three as shown in FIGS. 5 and 6 or four as shown in FIGS. 7 and 8, according to the flow rate, flow velocity, flow direction, and other conditions of the cooling fluid to be supplied to the tool.

Figure 9:
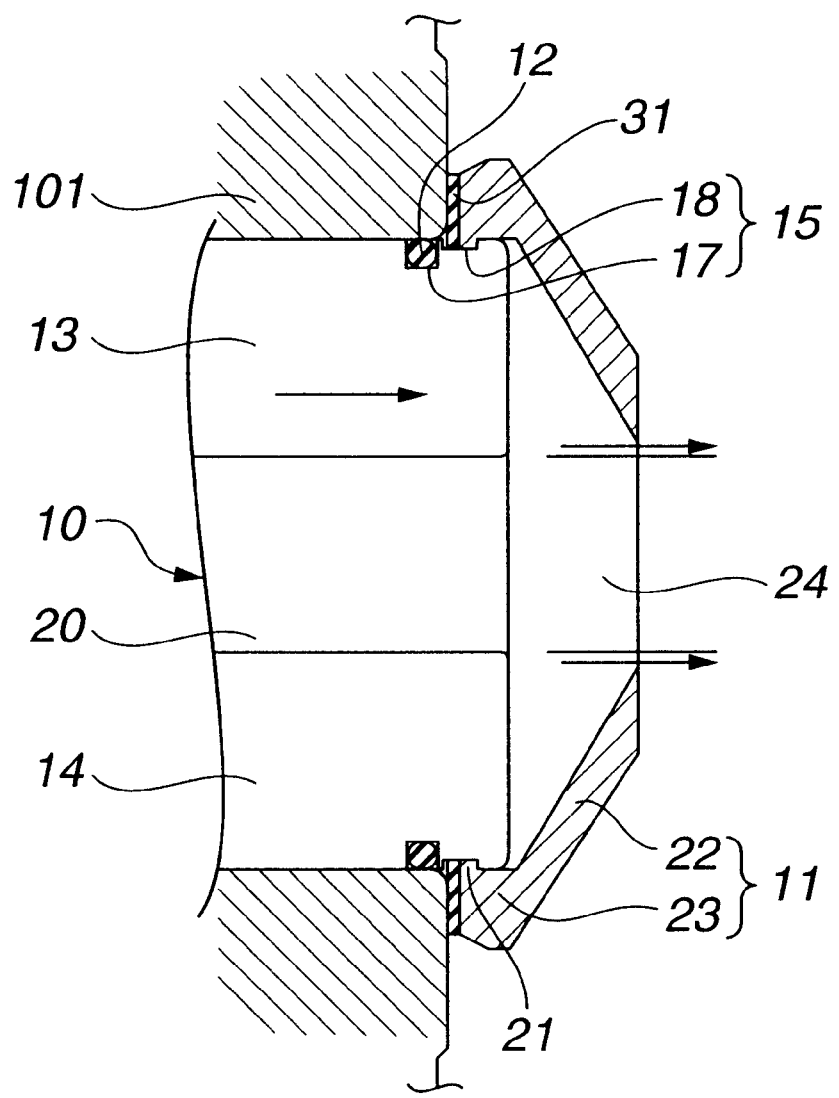
FIG. 9 is a sectional view illustrative of the state in which a capped collet according to another embodiment of this invention is mounted in a tool holder.

The placement position and shape of the sealing member 12 is not limited to the aforementioned structure, but various variations can be adopted. For example, as shown in FIG. 9, in addition to the sealing member 12, it is possible to provide a sealing member 31 on a contact face of the fitting part 23 of the cap 11 against the tool holder 101.

Figure 10:
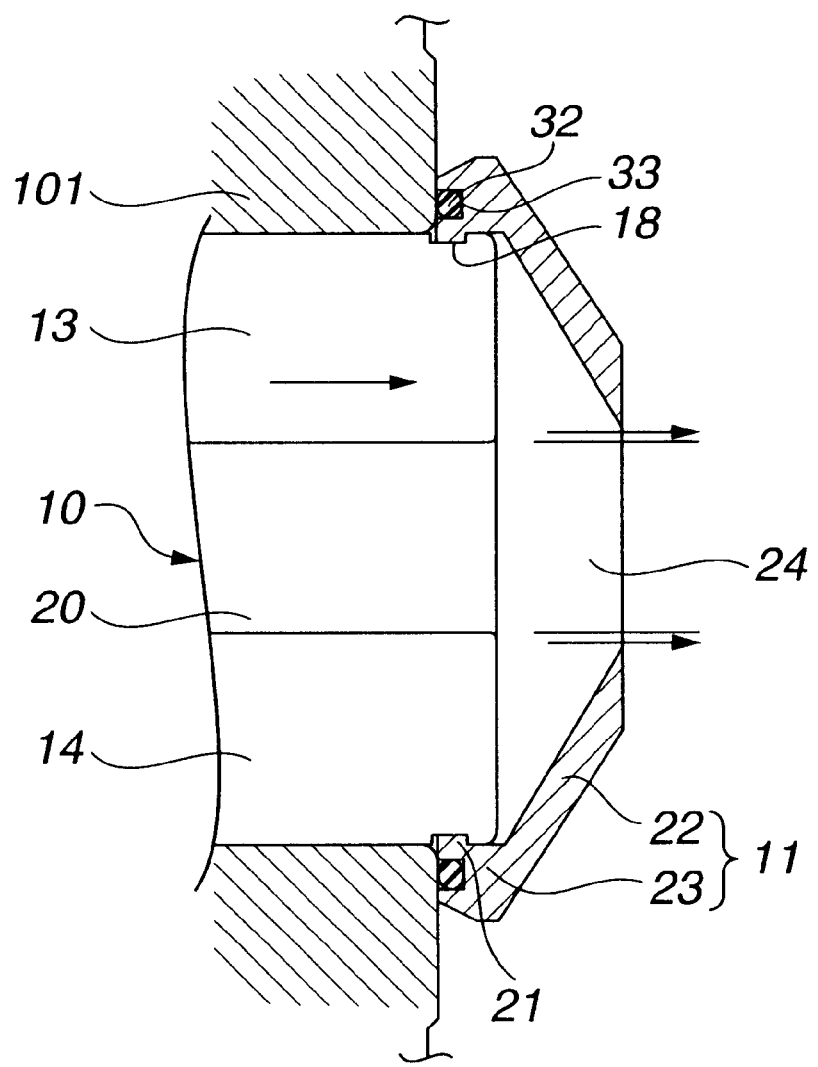
FIG. 10 is a sectional view illustrative of the state in which a capped collet according to still another embodiment of this invention is mounted in a tool holder.

Moreover, as shown in FIG. 10, it is possible to provide a sealing member 32, instead of the sealing member 12, on the contact face of the fitting part 23 of the cap 11 against the tool holder 101. In this case, an annular groove 33 into which the sealing member 32 can be inserted may be provided in the contact face of the fitting part 23 against the tool holder 101, and the sealing member 32 comprising, for example, an O-ring, may be placed in this annular groove 33, thereby hermetically sealing a space between the inner surface of the tool holder 101 and the cap 11.

Figure 11:
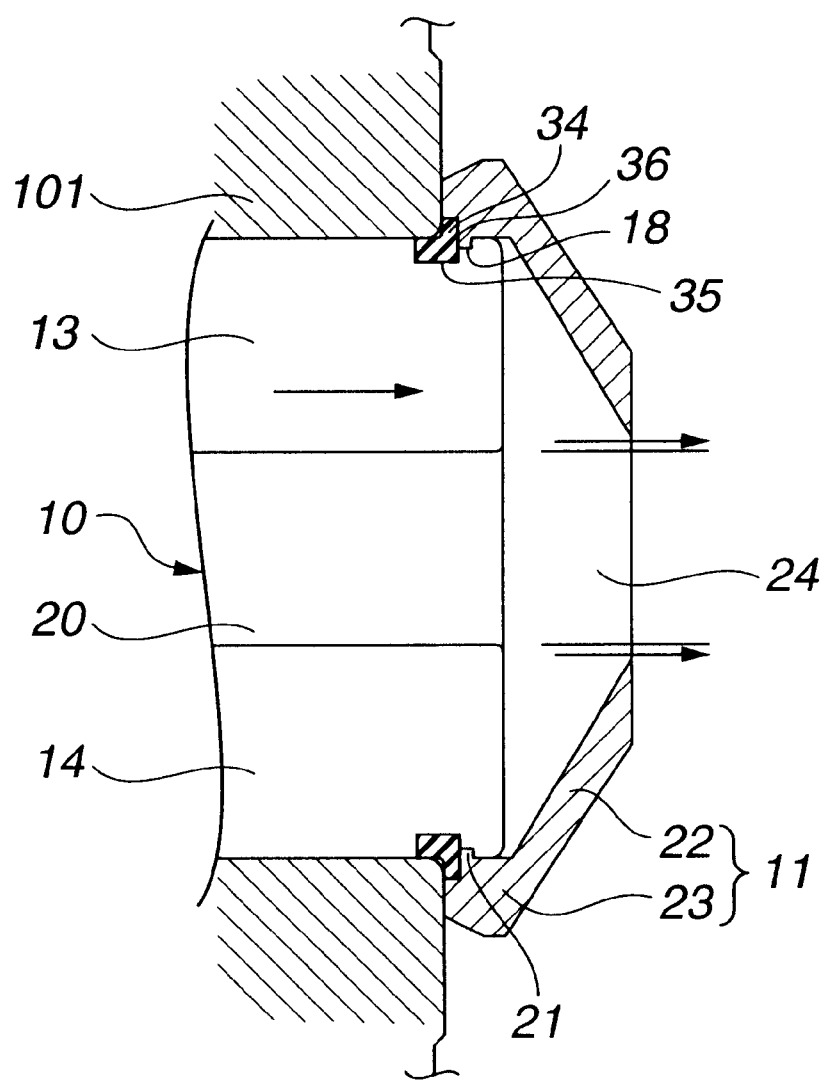
FIG. 11 is a sectional view illustrative of the state in which a capped collet according to a further embodiment of this invention is mounted in a tool holder.

Furthermore, as shown in FIG. 11, it is possible to provide, instead of the sealing member 12, a sealing member 34 having a cross section substantially in the shape of the letter "L." In this case, an annular groove 35 into which a part of the sealing member 34 can be inserted may be provided in the outer surface of the collet body 10, and an annular notch 36 into which a part of the sealing member 34 can be inserted may be formed in the contact face of the fitting part 23 of the cap 11 against the tool holder 101, and a specified part of the sealing member 34 may be placed (inserted) into the annular groove 35 and the annular notch 36, thereby hermetically sealing the space between the inner surface of the tool holder 101 and the cap 11.

Figure 12:
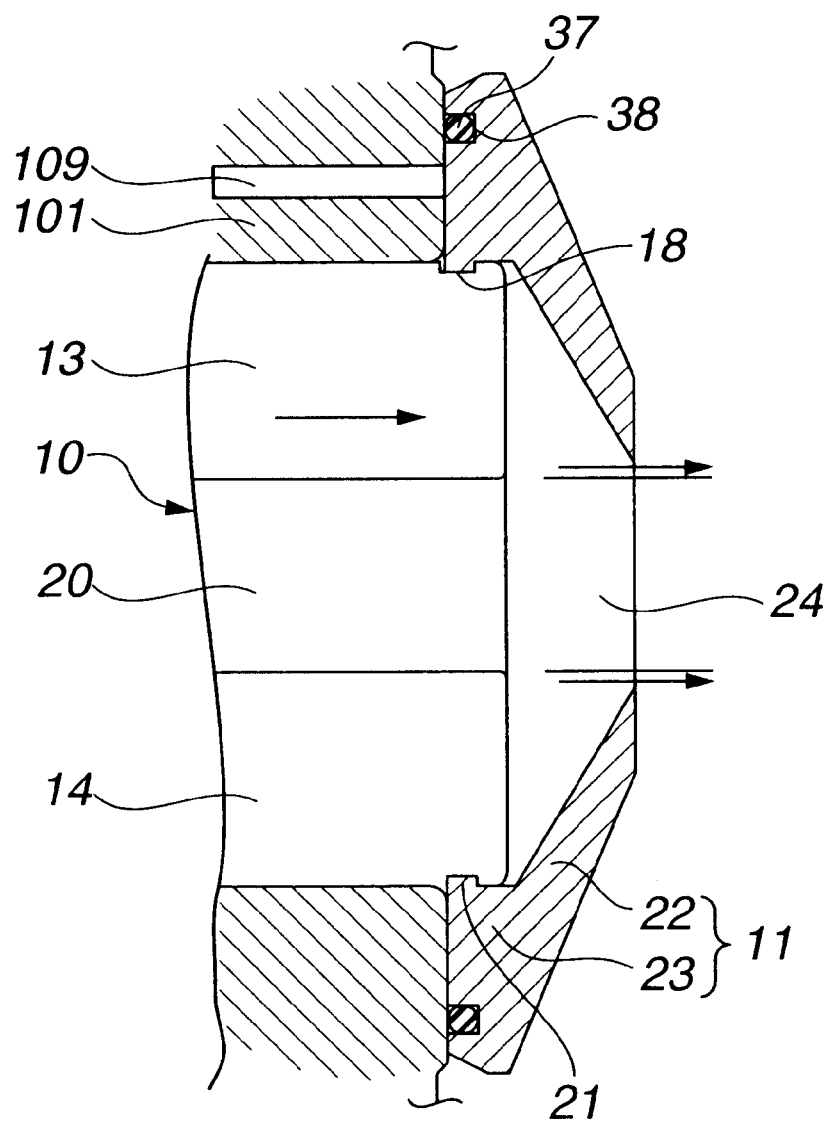
FIG. 12 is a sectional view illustrative of the state in which a capped collet according to still a further embodiment of this invention is mounted in a tool holder.
Figure 13:
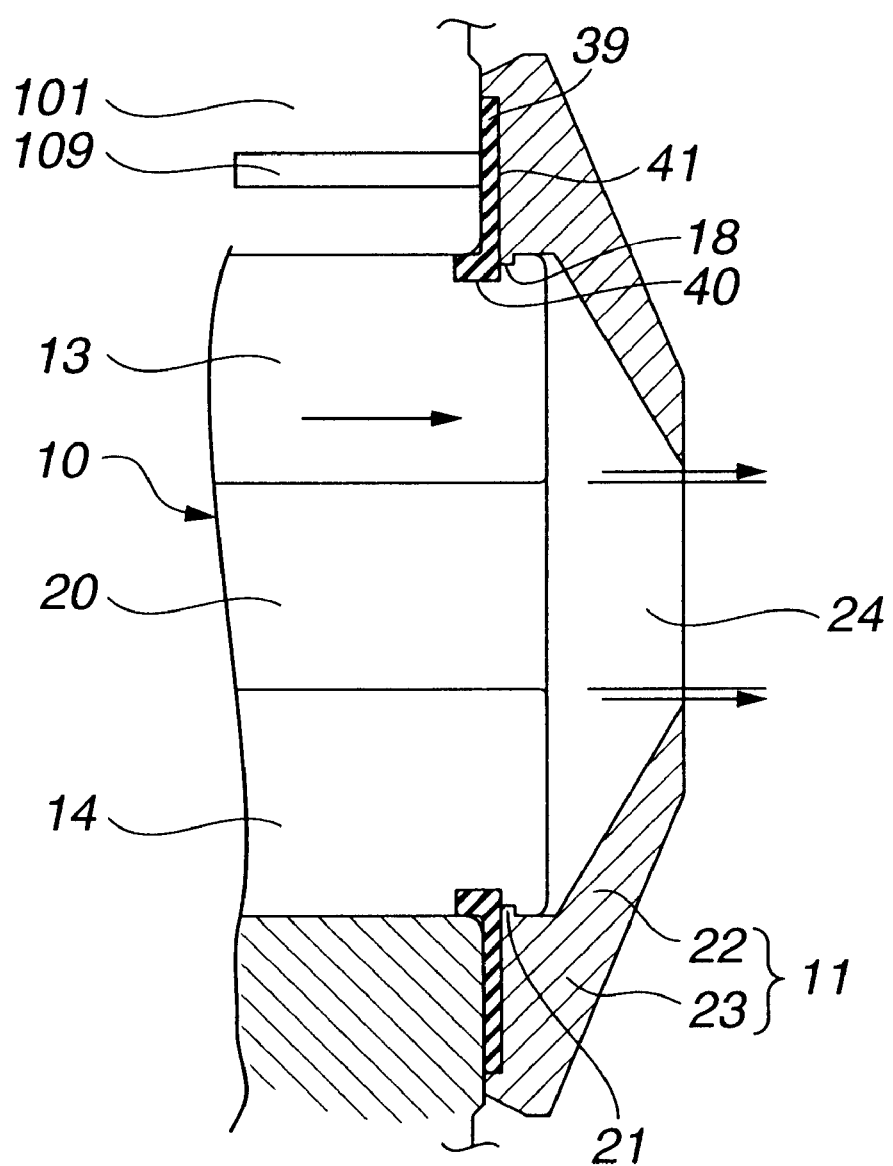
FIG. 13 is a sectional view illustrative of the state in which a capped collet according to yet a further embodiment of this invention is mounted in a tool holder.
Figure 14:
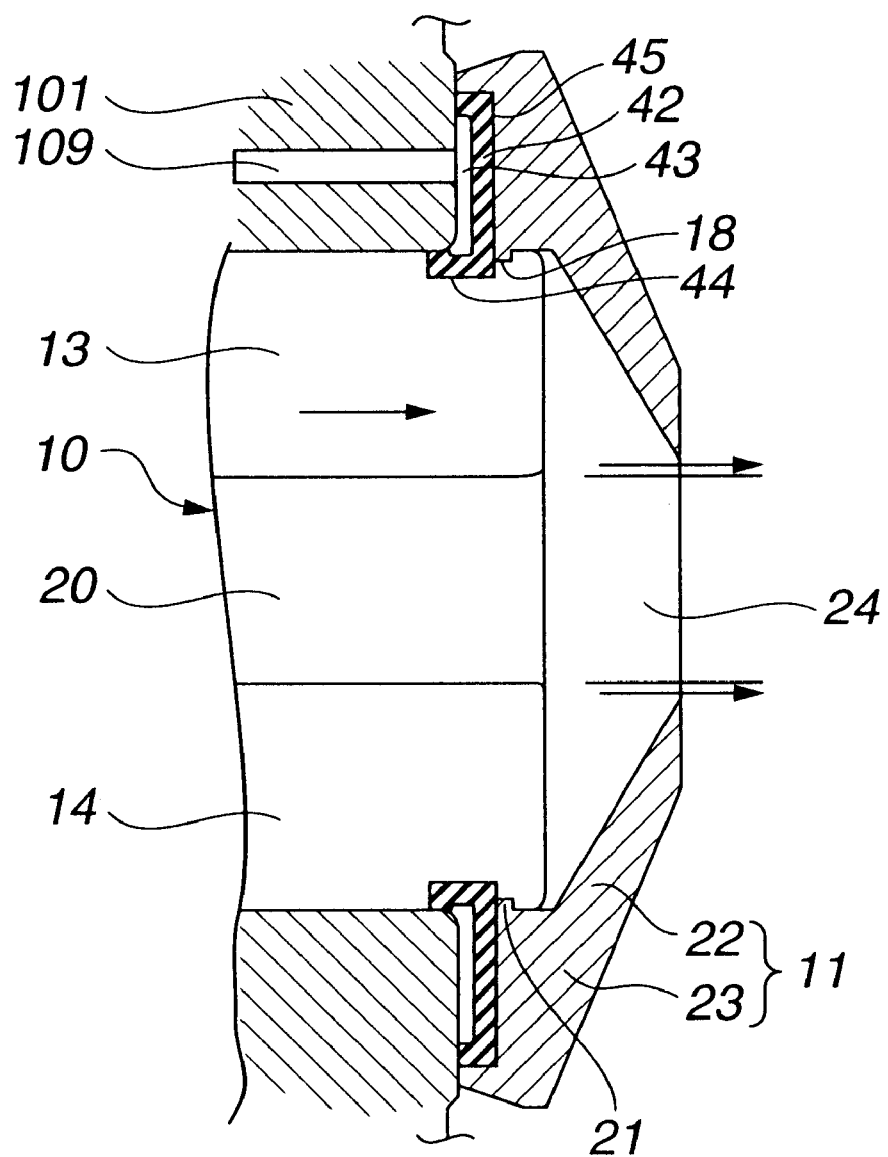
FIG. 14 is a sectional view illustrative of the state in which a capped collet according to an additional embodiment of this invention is mounted in a tool holder.

When a path 109 for the cooling fluid is formed in the tool holder 101 as shown in FIGS. 12 through 14, and when the cooling fluid is to be supplied to the tool 100 without using this path 109, but by utilizing the slots 13 formed in the collet body 10, it is possible to adopt the following methods.

First, the cap 11 can be structured in such a manner that the outside diameter of the fitting part 23 is extended so that the fitting part 23 of the cap 11 can cover the path 109, and a sealing member 37 can be provided, as shown in FIG. 12, on the contact face of the fitting part 23 against the tool holder 101 at a position closer to the outer edge of the cap 11 than the path 109. In this case, an annular groove 38 into which the sealing member 37 can be inserted may be provided on the contact face of the fitting part 23 against the tool holder 101, and the sealing member 37 comprising, for example, an O-ring, may be placed in this annular groove 38, thereby hermetically sealing the path 109 and the space between the inner surface of the tool holder 101 and the cap 11.

As shown in FIG. 13, it is also possible to provide, instead of the sealing member 12, a sealing member 39 having a cross section substantially in the shape of the letter "L" which has the width (or length) capable of blocking the path 109. In this case, an annular groove 40 into which a part of the sealing member 39 can be inserted may be provided in the outer surface of the collet body 10, and an annular notch 41 into which a part of the sealing member 39 can be inserted may be formed in the contact face of the fitting part 23 of the cap 11 against the tool holder 101 and with the width so that the path 109 can be completely blocked, and a specified part of the sealing member 39 may be placed (inserted) in the annular groove 40 and the notch 41, thereby hermetically sealing the path 109 and the space between the inner surface of the tool holder 101 and the cap 11.

As shown in FIG. 14, it is possible to provide, instead of the sealing member 12, a sealing member 42 having a concave cross section and the width (or length) that can block the path 109. Concerning the sealing member 42, an inside space defined by the concave shape of the cross section is a fluid-receiving area 43. This fluid-receiving area 43 receives the cooling fluid supplied from the path 109 and blocks the path 109, thereby hermetically sealing the space between the inner surface of the tool holder 101 and the cap 11. As a result of receiving the cooling fluid in the fluid-receiving area 43, it is possible to enhance the sealing effect by utilizing the pressure of the cooling fluid imposed on the sealing member 42. An annular groove 44 into which a part of the sealing member 42 can be inserted may be provided in the outer surface of the collet body 10, and an annular notch 45 into which a part of the sealing member 42 can be inserted may be formed in the surface, corresponding to a contact face, of the fitting part 23 of the cap 11 against the tool holder 101 and with the width so that the path 109 can be completely blocked. The sealing member 42 is positioned by inserting a specified part of the sealing member 42 in the annular groove 44 and the notch 45.

Figure 15:
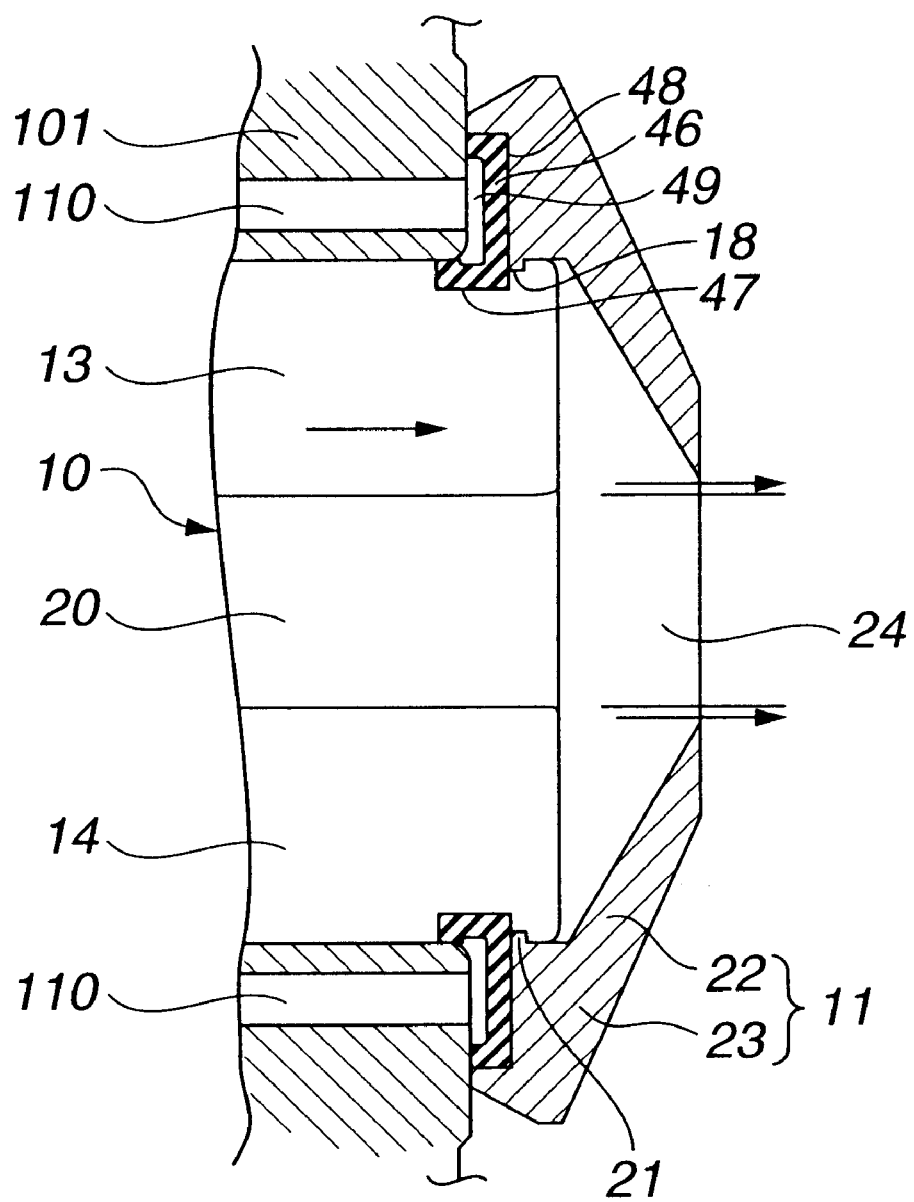
FIG. 15 is a sectional view illustrative of the state in which a capped collet according to an additional embodiment of this invention is mounted in a tool holder.

When slots 110 are formed from the top-end side in the axial direction, as show in FIG. 15, in order to cause the chuck cylinder 107 of the tool holder 101 to expand or contract its diameter by means of elastic deformation, it is possible to provide a sealing member 46 which prevents the cooling fluid from leaking out from the slots 110 and hermetically seals the space between the inner surface of the tool holder 101 and the cap 11. Specifically, this sealing member 46 has a concave cross section with such width (or length) that can block the slots 110, and an inside space defined by the concave shape of the cross section is a fluid-receiving area 49. This fluid-receiving area 49 receives the cooling fluid flowing out from the slots 110 and blocks the ends of the slots 110, thereby hermetically sealing the space between the inner surface of the tool holder 101 and the cap 11. An annular groove 47 into which a part of the sealing member 46 can be inserted may be provided in the outer surface of the collet body 10, and an annular notch 48 into which a part of the sealing member 46 can be inserted may be formed in the surface, corresponding to a contact face, of the fitting part 23 of the cap 11 against the tool holder 101 and with the width so that the slots 110 can be completely blocked. The sealing member 46 is positioned by inserting a specified part of the sealing member 46 in the annular groove 47 and the notch 48.

Figure 16:
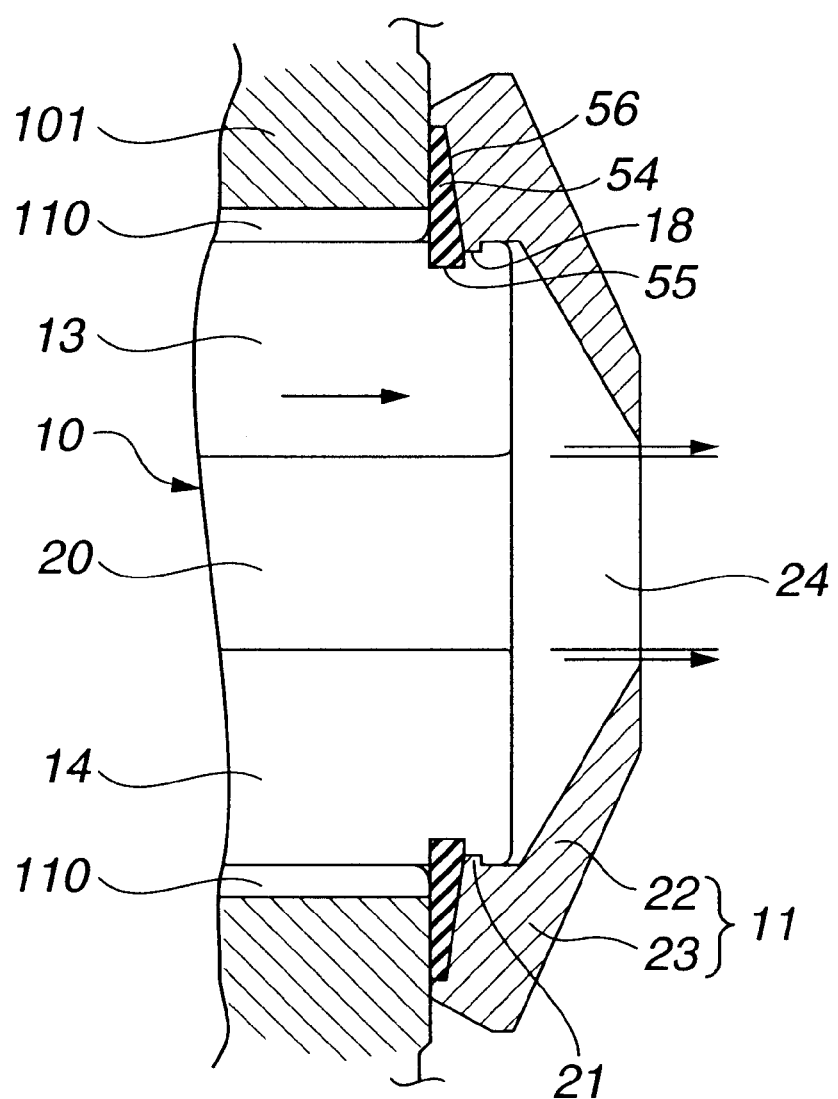
FIG. 16 is a sectional view illustrative of the state in which a capped collet according to an additional embodiment of this invention is mounted in a tool holder.

Moreover, as shown in FIG. 16, it is possible to provide a sealing member 54 which prevents the cooling fluid from leaking out from slots 110 similar to those in FIG. 15 and which hermetically seals a space between the inner surface of the tool holder 101 and the cap 11. Specifically, the sealing member 54 has a width (or length) capable of blocking the slots 110, and is tapered on its top-end side so that the thickness lessens toward its external boundary. An annular groove 55 into which a part of the sealing member 54 can be inserted may be provided in the outer surface of the collet body 10, and an annular tapered notch 56 into which a part of the sealing member 54 can be inserted may be formed in the surface, corresponding to a contact face, of the fitting part 23 of the cap 11 against the tool holder 101 and with the width so that the slots 110 can be completely blocked. The sealing member 54 is positioned by inserting a specified part of the sealing member 54 in the annular groove 55 and the notch 56.

Furthermore, in the cap 11 of this invention, fluid paths 26, 27, 28, and 29 for causing the cooling fluid to flow may be formed, as shown in FIGS. 17 and 18, at the inner boundary edge which defines the hole 24 of the cover 22. The fluid path 26 shown in FIG. 17 comprises a notch having a cross section substantially in the shape of a semicircle formed at the inner boundary edge which defines the hole 24. FIG. 17 illustrates the case in which a total of four fluid paths 26 are formed and spaced equally at an angle of 90 degrees between the adjacent fluid paths 26. However, the shape and size of the fluid paths, and the number and positions of placement of the fluid paths can be decided according to desired conditions such as the flow rate, flow velocity, and flow direction of the cooling fluid to be supplied to the tool.

For example, as shown in FIG. 18(1), a fluid path 27 comprising a substantially circular hole may be provided at a position close to the inner boundary edge which defines the hole 24. Moreover, as shown in FIG. 18(2), a fluid path 28 comprising a substantially rectangular notch may be provided at the inner boundary edge which defines the hole 24. Furthermore, as shown in FIG. 18(3), a fluid path 29 comprising a notch which is shaped substantially in a circle on its one side closer to the external boundary and is shaped substantially in a rectangle on the other side closer to the inner boundary may be provided at the inner boundary edge which defines the hole 24.

Concerning the cap 11 with the fluid paths formed in its cover 22, it does not matter whether any gap for causing the cooling fluid to flow out is formed or not between the cap 11 and the outer surface of the tool 100. In other words, both the gap and the fluid paths may be used or only the fluid paths may be used to cause the cooling fluid to flow out, depending on desired conditions such as the flow rate, flow velocity, and flow direction of the cooling fluid to be supplied to the tool 100.

Figure 19:
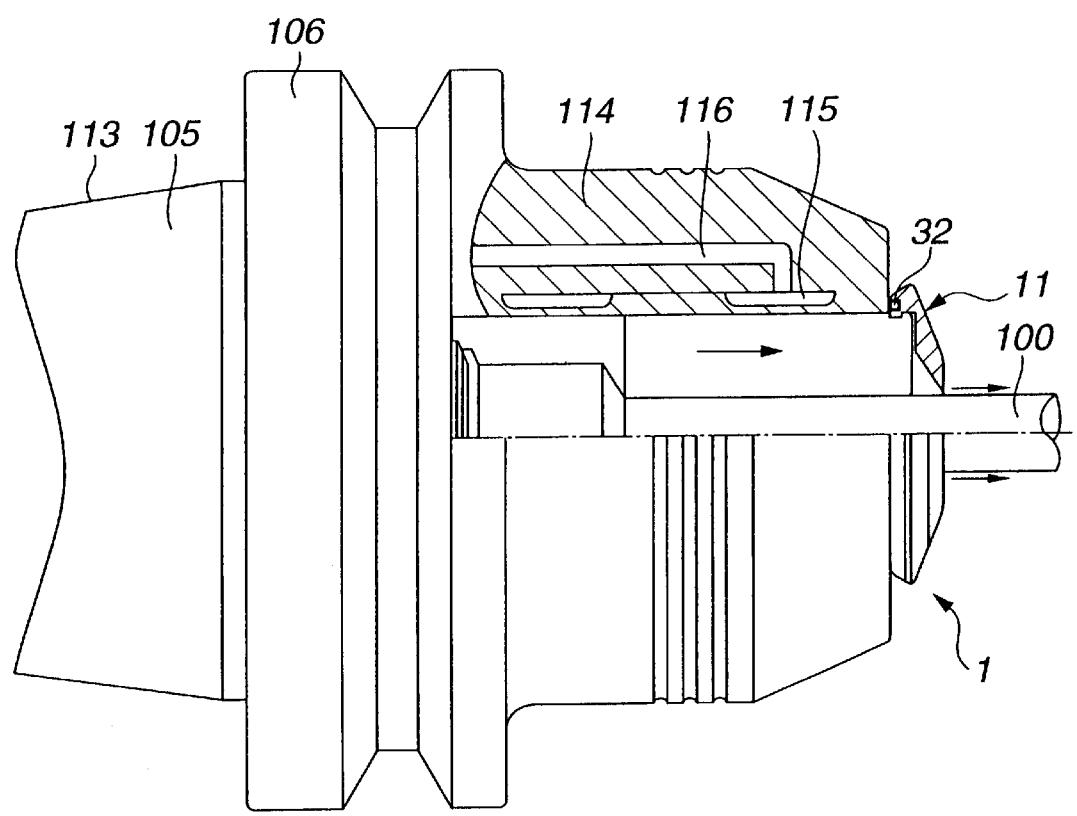
FIG. 19 is a sectional view illustrative of the state in which the capped collet according to Embodiment 1 of this invention is mounted in another tool holder.

Furthermore, as shown in FIG. 19, the capped collet 1 of this invention can be applied to a hydraulic tool holder (or hydraulic chuck) for holding and securing the collet body 10 by means of oil pressure. This hydraulic tool holder 113 comprises: a tapered shank 105; a chuck positioning flange 106 formed at the larger-diameter end of the tapered shank 105; and a chuck cylinder 114 which protrudes from the flange 106 toward the top-end side of the tool holder body 102 and is arranged coaxially and integrally with the flange 106 and the tool holder body 102. The chuck cylinder 114 has slots (not shown in the drawing) formed from the top-end side in the axial direction. The chuck cylinder 114 also internally comprises an oil supply source (not shown in the drawing) for supplying desired oil through a supply path 116 to a hydraulic chamber 115. According to the amount of oil supplied from the oil supply source to the hydraulic chamber 115, the chuck cylinder 114 can expand or contract its diameter by means of elastic deformation attributable to the existence of the slots (not shown in the drawing). All the capped collets described above can be adopted for this hydraulic tool holder 113.

(Embodiment 2)

A capped collet according to Embodiment 2 of this invention is hereinafter explained with reference to the attached drawings.

Figure 20:
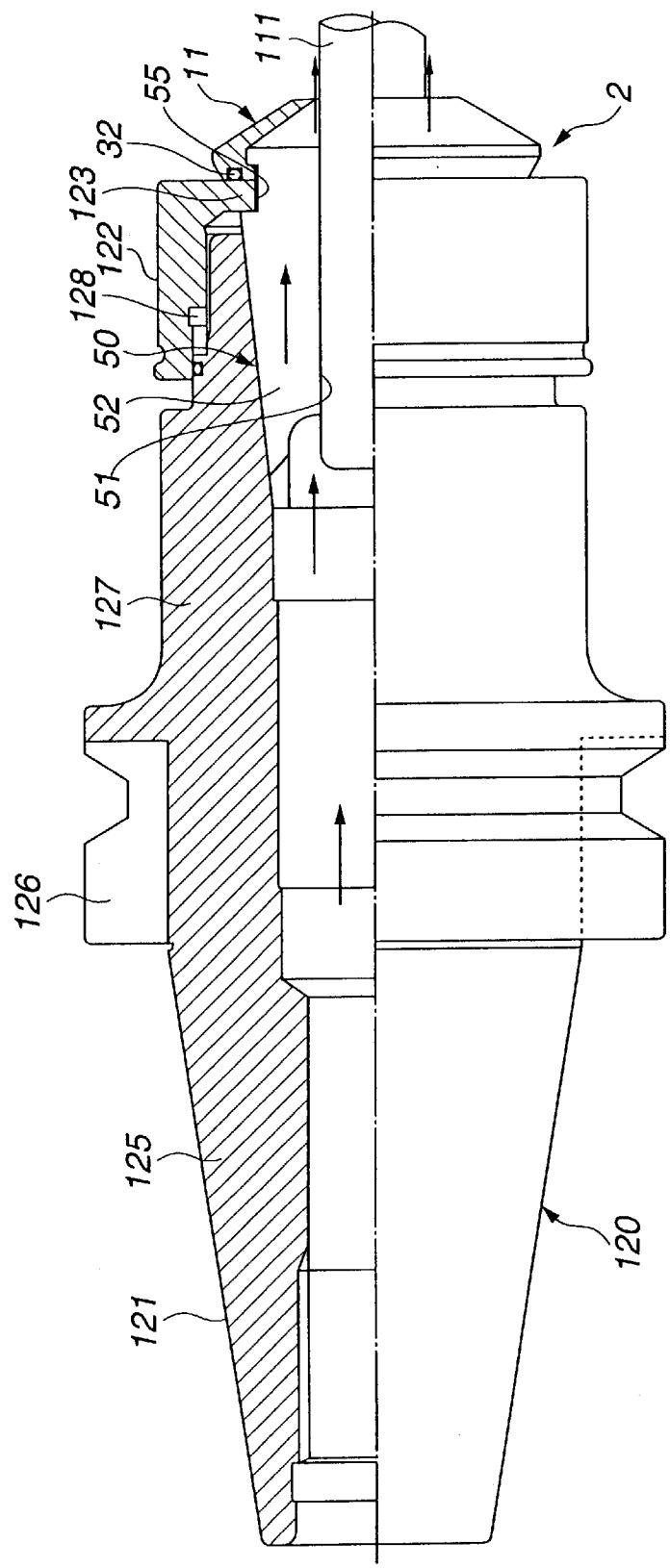
FIG. 20 is a partially sectional view illustrative of the state in which a capped collet according to Embodiment 2 of this invention is mounted in a tool holder.
Figure 21:
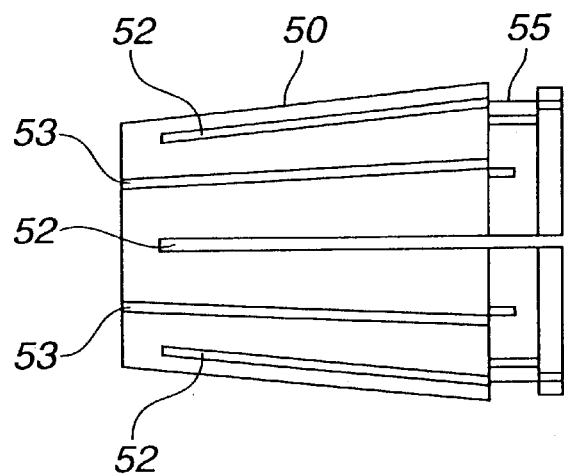
FIG. 21 is a side view of the collet shown in FIG. 20.
Figure 22:
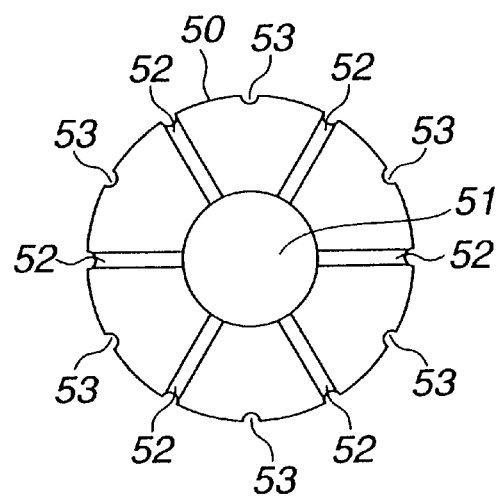
FIG. 22 is a plan view of the collet shown in FIG. 21.

FIG. 20 is a partially sectional view illustrative of the state in which the capped collet according to Embodiment 2 of this invention is mounted in the tool holder. FIG. 21 is a side view of the collet shown in FIG. 20. FIG. 22 is a plan view of the collet shown in FIG. 21. The elements of Embodiment 2 which are similar to those of Embodiment 1 are given the same reference numerals, and any detailed explanation thereof is omitted.

As shown in FIGS. 20 through 22, a capped collet 2 of Embodiment 2 is different from the capped collet 1 of Embodiment 1 in that a tapered collet is used and a tool holder 120 suited for the tapered collet is used.

Specifically, the capped collet 2 of Embodiment 2 is a tapered collet and comprises: a collet body 50 for inserting and holding a shank of a tool 111 in its center hole 51; a cap 11 mounted on the top-end side of the collet body 50 in a freely attachable and detachable manner, for causing the tool 111 to pierce through the cap 11; and a sealing member 32 located between a tool holder 120 and the cap 11, for hermetically sealing a space between them.

The collet body 50 is composed by comprising: slots 52 formed in the axial direction from the top-end side; slots 53 formed in the axial direction from the base-end side and between the adjacent slots 52; and an annular groove 55 which is provided at the top-end position, is coupled with an annular projection 21 of the cap 11, and is coupled with a coupling edge 123 of a nut 122 of the tool holder 120 as described later.

A total of six slots 52 are formed, which are equally spaced at the same angle (60° in Embodiment 2). Likewise, a total of six slots 53 are formed, which are also equally spaced at the same angle. The collet body 50 with these slots 52 and 53 formed therein can expand or contract its own diameter by means of elastic deformation, thereby releasing or holding the shank of the tool 111.

The tool holder 120 in which the capped collet 2 is mounted is composed by comprising a tool holder body 121 and a nut 122 which is provided on the top-end side of the tool holder body 121 and clamps and secures the capped collet 2 inserted into the tool holder body 121.

The tool holder body 121 comprises: a tapered shank 125 mounted on a main spindle (not shown in the relevant drawing) of, for example, a tool machine; a chuck positioning flange 126 which is formed at the end of the tapered shank 125 on its larger-diameter side; and a chuck cylinder 127 which protrudes from the flange 126 toward the top-end side of the tool holder body 121 and is arranged coaxially and integrally with the flange 126 and the tool holder body 121. The diameter of a part of the chuck cylinder 127 on the top-end side that is externally coupled with the nut 122 is smaller than the other part of the chuck cylinder 127 on the base-end side.

The nut 122 comprises a coupling edge 123 which is coupled with the base-end side of the annular groove 55 formed at the top-end part of the collet body 50, and is provided in the manner freely rotatable, through a connecting sphere 128, relative to the outer surface of the chuck cylinder 127, and clamps in the radial direction and secures the capped collet 2 inserted into the tool holder body 121.

The tool 111 is inserted into the capped collet 2 having the above-described structure, and this collet 2 is then inserted into the tool holder 120 and the nut 122 is turned, and the capped collet 2 thereby secures the tool 111.

When the tool holder 120 is rotated in this state and the tool 111 is used to process a work, as the cooling fluid is supplied from the base-end side of the capped collet 2, the cooling fluid tends to flow through the slots 52 toward the top end as shown with an arrow in FIG. 19 in the same manner as in Embodiment 1. Since the sealing member 32 is placed on the top-end side of the collet body 50, the cooling fluid does not leak out between the inner surface of the tool holder 120 and the cap 11, but is lead to the top end of the collet body 50 and is then supplied efficiently to a desired position such as the cutting edge of the tool 111 from the gap formed between the cap 11 and the outer surface of the tool 111. It is also possible to obtain the effect of mating it easier to control the flow direction of the cooling fluid.

Needless to say, even when the tapered collet is used, the cap and any variation thereof, and the sealing member and any variation thereof which are explained in Embodiment 1 can also be used. Concerning the slots formed in the collet body 50, the collet body 50 may at least have the slots 52 formed from the top-end side. The number of the slots 52 to be formed can be decided arbitrarily as desired depending on the flow rate, flow velocity, flow direction, and other conditions of the cooling fluid to be supplied to the tool 111.

(Embodiment 3)

A capped collet according to Embodiment 3 of this invention is hereinafter explained with reference to the attached drawings.

Figure 23:
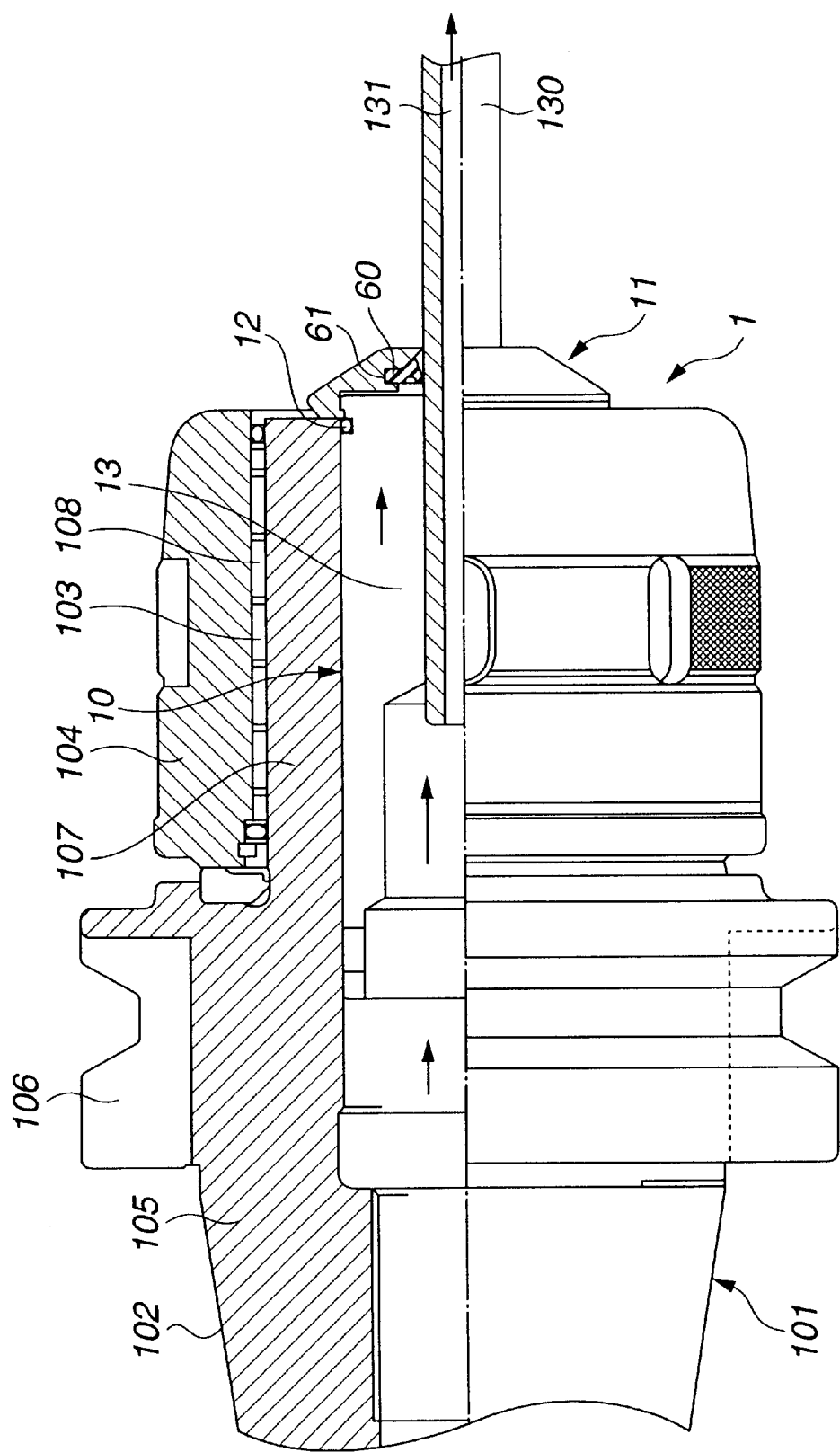
FIG. 23 is a partially sectional view illustrative of the state in which a capped collet according to Embodiment 3 of this invention is mounted in a tool holder.
Figure 24:
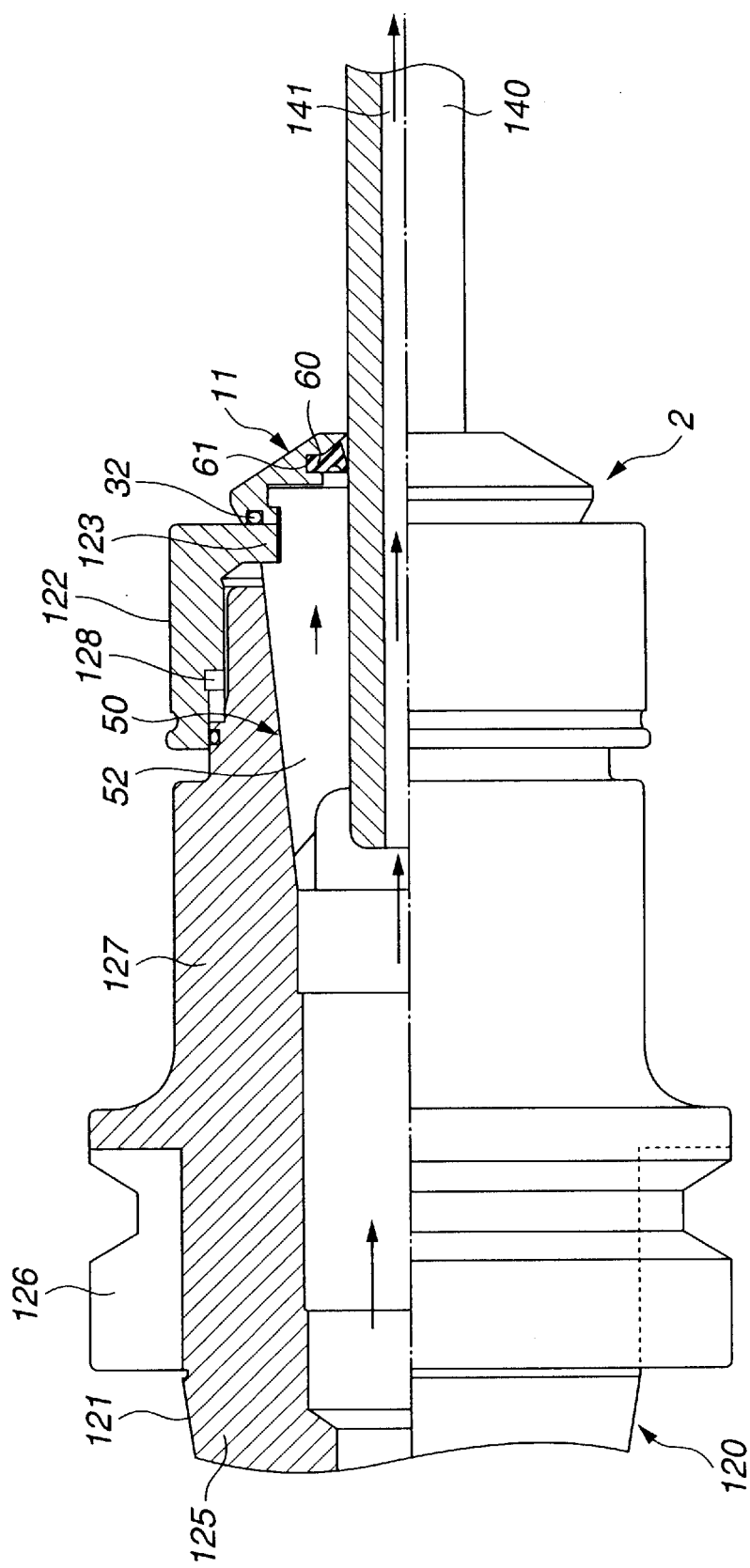
FIG. 24 is a partially sectional view illustrative of the state in which a capped collet according to another embodiment of this invention is mounted in a tool holder.

FIG. 23 is a partially sectional view illustrative of the state in which the capped collet according to Embodiment 3 of this invention is mounted in the tool holder. The elements of Embodiment 3 which are similar to those of Embodiment 1 are given the same reference numerals, and any detailed explanation thereof is omitted.

As shown in FIG. 23, in Embodiment 3, the capped collet 1 of Embodiment 1 holds and secures a tool 130 having a through hole 131 formed therein to cause the cooling fluid to flow through. Needless to say, the capped collet 1 which holds and secures the tool 130 hermetically seals a space between the tool holder 101 and the cap 11. Moreover, in order to cause the cooling fluid to flow out efficiently from the through hole 131, a sealing member 60 is provided to hermetically seal a space between the inner boundary edge of the hole 24 of the cap 11 and the tool 131.

This sealing member 60 is secured in the state in which a part of the sealing member 60 is inserted into an annular groove 61 formed in the inner surface of the cover 22 of the cap 11. The sealing member 60 has a substantially triangular cross section with a small difference between its outside diameter and its inside diameter on the top-end side and with a relatively large difference between the outside diameter and the inside diameter on the base-end side. Accordingly, the sealing member 60 is structured so that the higher the pressure of the cooling fluid is, the more tightly the sealing member 60 is pressed against the outer surface of the tool 130, thereby enhancing the sealability. In other words, the pressure of the cooling fluid causes the space between the cap and the tool to be hermetically sealed more tightly.

As explained in Embodiment 1, when the cooling fluid is supplied from the base-end side to this capped collet 1 in the state in which the collet 1 is held and secured by the tool holder 101 and retains the tool 130, the cooling fluid passes through the slots 13 and reaches the top-end side, but the sealing member 60 provided on the cap 11 prevents the cooling fluid from leaking out between the outer surface of the tool 130 and the cap 11. At this time, the sealing member 60 is pressed against the top-end side by the pressure of the cooling fluid. This pressure causes the sealing member 60 to be pressed sufficiently tightly against the outer surface of the tool 130, thereby enhancing the sealability. The sealing member 12 can also prevent the cooling fluid from leaking out between the tool holder 101 and the cap 11.

Embodiment 3 has explained the sealing member 60 which has a substantially triangular cross section and enhances the sealability by means of the pressure of the cooling fluid. However, without limitation to such type of sealing member, any sealing member in various shapes, such as an O-ring, can be used as long as it can hermetically seal the space between the outer surface of the tool 130 and the cap 11.

Moreover, Embodiment 3 has explained the case in which the tool having the through hole formed therein is held and secured by the capped straight collet. However, it goes without saying that it can be applied to the case in which a tool 140 having a through hole 141 formed therein is held and secured by the capped tapered collet, that is, the capped collet 2 having the structure as described in Embodiment 2.

Figure 25:
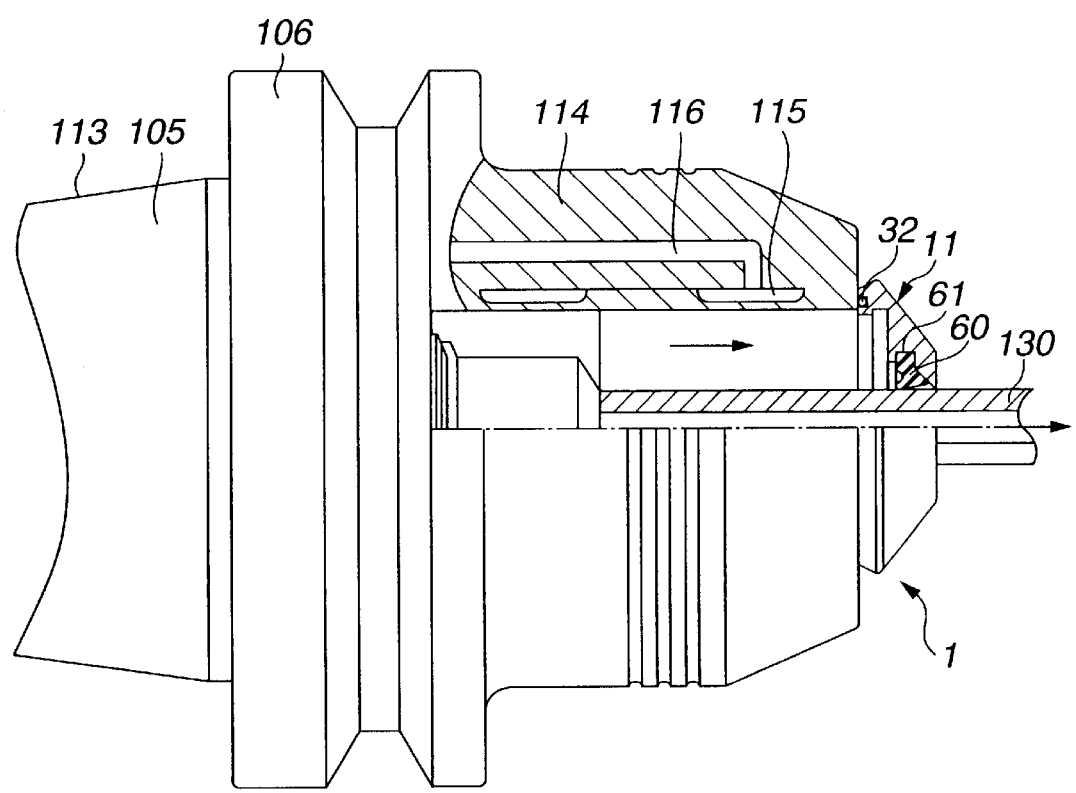
FIG. 25 is a partially sectional view illustrative of the state in which the capped collet according to Embodiment 3 of this invention is mounted in another tool holder.

Moreover, it goes without saying that, as shown in FIG. 25, it can be applied to the case in which the capped collet of the aforementioned embodiments is mounted in the hydraulic tool holder 113 to hold and secure the tool 130 having the through hole 131 therein.

The cap 11 explained in Embodiments 1 through 3 can be used as a collet cap for other types of collets. In this case, the collet cap is structured so that it contains the sealing member which is located between the tool holder and the cap and hermetically seals the space between them.

As described above, the capped collet of this invention can allow the attachment and removal of the cap and hermetically seal the space between the tool holder and the cap. Accordingly, if the tool itself has no through hole for supplying the cooling fluid, the cooling fluid is caused to flow out from between the cap and the tool or from the fluid paths formed in the cap. If the tool itself has the through hole, it is possible to hermetically seal the space between the cap and the tool and to cause the cooling fluid to flow out from the through hole. As a result, it is possible to enhance general versatility by replacing the cap with another cap in the shape which satisfies various conditions such as the oil supply pattern of the tool, and desired flow rate, flow velocity, and flow direction of the cooling fluid.

The collet cap of this invention can be removed from the collet. Accordingly, it is possible to enhance general versatility of the collet by using the cap formed in the shape that can satisfy various conditions such as the oil supply pattern of the tool, and desired flow rate, flow velocity, and flow direction of the cooling fluid.

What is claimed is:

1. A capped collet for holding a tool by inserting a shank of the tool into a center hole of the collet mounted in a tool holder for supplying a fluid to the tool, the collet comprising:
    a collet body for inserting the shank of the tool therein;
    a cap mounted on a tool-inserting side of the collet body in an attachable and detachable manner, for allowing the tool to pierce therethrough; and
    a sealing member located between the tool holder and the cap, for hermetically sealing a space therebetween;
    wherein the collet body comprises a slot formed at least from the tool-inserting side thereof, and a second coupling element formed in the tool-inserting side thereof to couple with the cap; and
    wherein the cap comprises a first coupling element for coupling with the second coupling element of the collet body, and a cover for covering a tool inserting end face of the collet body.

2. The capped collet according to claim 1, wherein the second coupling element comprises an annular groove formed around an outer surface of the collet body on its tool-inserting side.

3. The capped collet according to claim 2, wherein the first coupling element comprises an annular projection formed around an inner surface of the cap, for coupling with the annular groove formed in the collet body.

4. The capped collet according to claim 1, wherein the fluid is caused to flow out from a gap formed between the cover of the cap and the tool.

5. The capped collet according to claim 1, wherein the cover of the cap has a fluid path formed therein for causing the fluid to flow out.

6. The capped collet according to claim 1, wherein the sealing member seals a space between the cover of the cap and the tool, and wherein the tool has a through hole formed therein to cause the fluid to flow out.

7. The capped collet according to claim 6, wherein the sealing member causes the space to be hermetically sealed more tightly by means of a pressure of the fluid.

8. The capped collet according to claim 1, wherein the collet is a straight collet or a tapered collet.

9. A cap and seal arrangement comprising:
    a cap constructed and arranged to be attached in an attachable and detachable manner to a tool-inserting side of a collet for holding a tool by inserting a shank of the tool into a center hole of the collet, the collet mounted in a tool holder for supplying a fluid to the tool, the cap comprising:
    a first coupling element for coupling with a second coupling element formed in the tool-inserting side of the collet; and
    a cover for covering the end face of the collet on the tool-inserting side; and
    a sealing member located between the tool holder and the cap, for hermetically sealing a space therebetween.

10. The cap according to claim 9, wherein the first coupling element comprises an annular projection formed around an inner surface of the cap, for coupling with an annular groove formed around an outer surface of the collet.

11. The cap according to claim 9 or 10, wherein the fluid is caused to flow out from a gap formed between the cover of the cap and the tool.

12. The cap according to claim 9 or 10, wherein the cover has a fluid path formed therein for causing the fluid to flow out.

13. The cap according to claim 9 or 10, wherein the sealing member seals a space between the cover and the tool, and wherein the tool has a through hole formed therein to cause the fluid to flow out.

14. The cap according to claim 13, wherein the sealing member causes the space to be hermetically sealed more tightly by means of the pressure of the fluid.

15. A capped collet for holding a tool by inserting a shank of the tool into a center hole of the collet mounted in a tool holder having a clamping rotary sleeve coupled with an outer surface of a tool holder body for supplying a fluid to the tool, the collet comprising:

a tapered collet body for inserting the shank of the tool therein;

a cap mounted on a tool-inserting side of the tapered collet body in an attachable and detachable manner, for allowing the tool to pierce therethrough; and a sealing member located between the clamping rotary sleeve and the cap, for hermetically sealing a space therebetween;

wherein the tapered collet body comprises a slot formed at least from the tool-inserting side thereof, and a second coupling element formed in the tool-inserting side thereof to couple with the cap; and wherein the cap comprises a first coupling element for coupling with the second coupling element of the tapered collet body, and a cover for covering a tool-inserting end face of the tapered collet body.

16. A cap and seal arrangement comprising:

a cap constructed and arranged to be attached in an attachable and detachable manner to a tool-inserting side of a tapered collet for holding a tool by inserting a shank of the tool into a center hole of the tapered collet, the tapered collet mounted in a tool holder having a clamping rotary sleeve coupled with an outer surface of a tool holder body for supplying a fluid to the tool, the cap comprising:

a first coupling element for coupling with a second coupling element formed in the tool-inserting side of the tapered collet; and a cover for covering the end face of the tapered collet on the tool-inserting side; and a sealing member located between the clamping rotary sleeve and the cap, for hermetically sealing a space therebetween.

* * * * *